Feb. 19, 1929.
E. L. HOLMES
1,702,404
ELECTROLYTIC RELAY SYSTEM
Filed Jan. 24, 1925 2 Sheets-Sheet 1
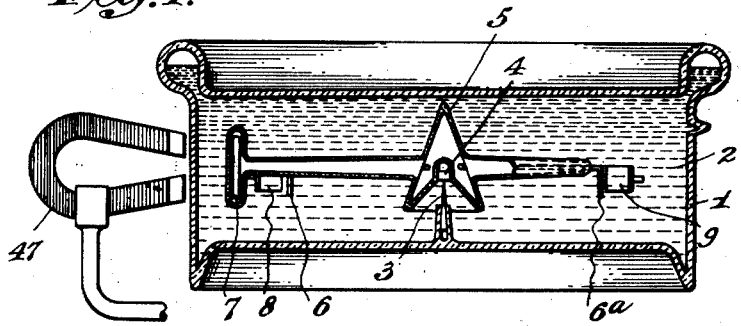
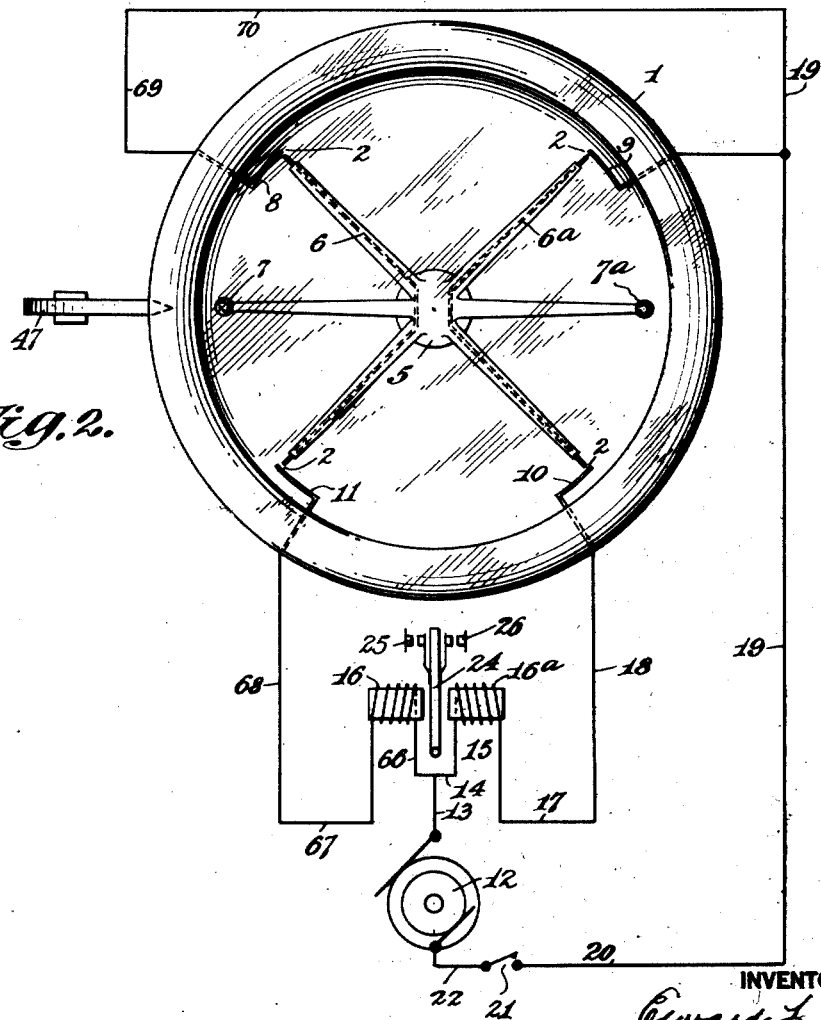

Feb. 19, 1929.

E. L. HOLMES 1,702,404

ELECTROLYTIC RELAY SYSTEM

Filed Jan. 24, 1925     2 Sheets-Sheet 2

INVENTOR
Edward L. Holmes
BY
ATTORNEYS

Patented Feb. 19, 1929.

1,702,404

UNITED STATES PATENT OFFICE.

EDWARD L. HOLMES, OF NEW YORK, N. Y., ASSIGNOR TO HOLMES NAVIGATING APPARATUS CO., INC., OF NEW YORK, N. Y., A CORPORATION OF NEW YORK.

ELECTROLYTIC RELAY SYSTEM.

Application filed January 24, 1925. Serial No. 4,621.

The following is a description of an electrolytic relay system and methods of operating the same embodying my invention in the form and manner at present preferred by me; but it will be understood that various modifications and changes may be made without departing from the spirit of my invention and without exceeding the scope of my claims.

Figure 4:
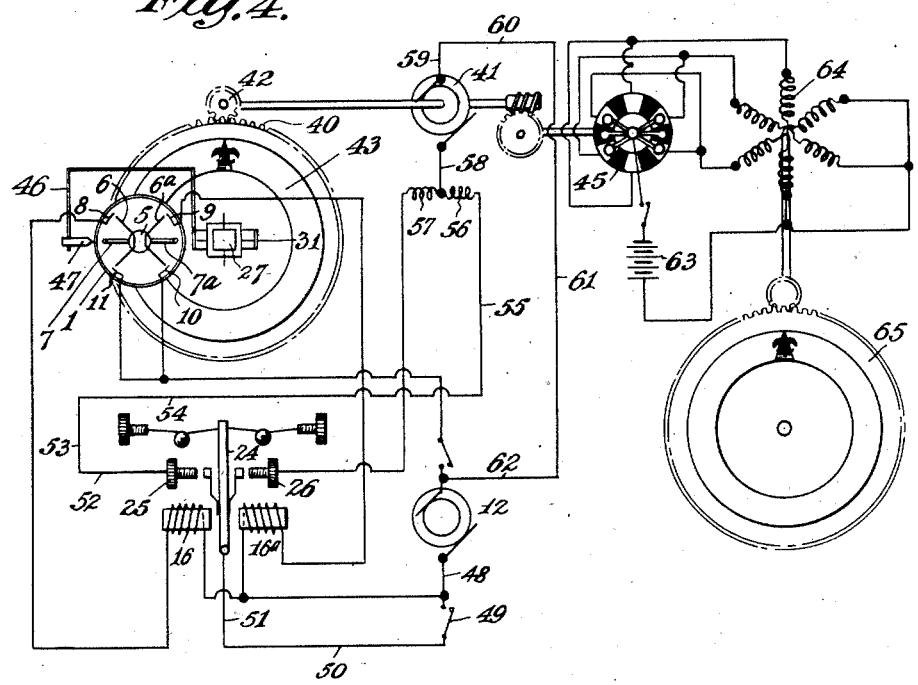
Figure 3:
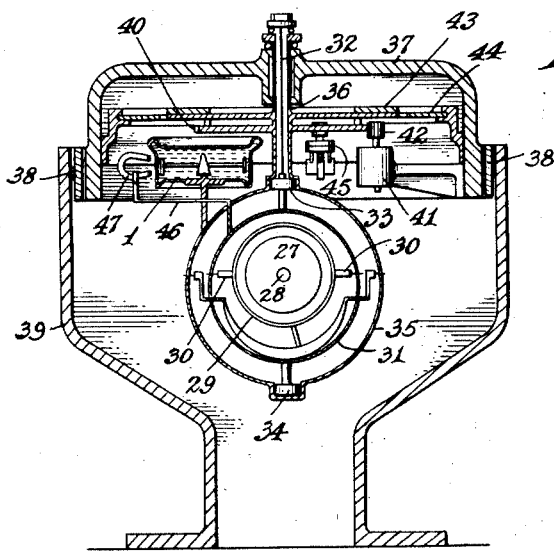

My invention will best be understood by reference to the accompanying drawings, in which Fig. 1 shows in vertical section an electrolytic cell containing a pivotally mounted housing carrying electrical conductors and magnetically-responsive elements; Fig. 2 is a top plan view of said electrolytic cell and associated elements, together with a wiring diagram and an electrical translating device which may be used in connection therewith; Fig. 3 shows, partly in vertical section and partly in elevation, the method of operatively connecting my relay to a gyro-compass; and Fig. 4 shows schematically and in plan the units of a repeater-compass system in which my relay is incorporated, together with a wiring diagram which may be employed in connection therewith. Like reference characters refer to like parts throughout the drawings.

Referring to the drawings (Fig. 1 and Fig. 2), 1 represents a bowl or other container (preferably formed of glass), carrying an electrolyte 2, in which may be rotatably mounted, as upon pivot 3, bearing in a jewel 4, a housing 5, formed of insulating material, such as glass, and carrying pivotal conductors 6 and 6ª and magnetically-responsive elements 7 and 7ª, formed of soft iron. Mounted in the periphery of container 1 are four stationary conductors 8, 9, 10 and 11. Alternating current from one terminal of source 12 flows through lines 13, 14 and 15, relay coil 16ª, lines 17 and 18, stationary conductor 10, electrolyte 2, pivotal conductor 6ª, electrolyte 2, stationary conductor 9, lines 19 and 20, switch 21, line 22 to opposite terminal of said source 12. Alternating current also flows from the first-named terminal of source 12 through lines 13 and 66, relay coil 16, lines 67 and 68, stationary conductor 11, electrolyte 2, pivotal conductor 6, electrolyte 2, stationary conductor 8, lines 69, 70, 19 and 20, switch 21 and line 22, to opposite terminal of said source 12.

Pivotal conductors 6 and 6ª are preferably formed of platinum wire, both ends of each of said conductors projecting downwardly. Stationary conductors 8, 9, 10 and 11 are preferably formed of strips of platinum. This arrangement renders the resistance of the electrolytic paths very sensitive to slight displacements between such stationary and pivotal conductors. In order to localize these electrolytic paths between the stationary conductors and the pivotal conductors and thereby make the device still more sensitive, I preferably insulate all of the surfaces of the pivotal conductors except the downwardly-projecting portions thereof, by enclosing same in vitreous material (such as glass) which is fused thereto.

With the stationary and pivotal conductors in normal operative relationship, and so long as there is no movement between housing 5 and container 1, the energization of relay coils 16 and 16ª is substantially equal, and relay armature 24 remains in a neutral position in which it does not close a secondary circuit. However, upon a slight rotative displacement between said members, due, for example, to said container 1 being moved in a clockwise direction, the electrolytic paths between stationary conductors 9 and 10 and pivotal conductor 6ª are lengthened, thereby increasing the resistance of the circuit which includes said pivotal conductor 6ª and relay coil 16ª. Due to the form of the pivotal conductors and of the stationary conductors, respectively, and to their operative relationship, the clockwise movement of container 1 has produced substantially no change in the length of the electrolytic paths between stationary conductors 8 and 11 and pivotal conductor 6. Consequently the resistance of the circuit which includes pivotal conductor 6 and relay coil 16 remains practically constant. Thus the energization of relay coil 16 is greater than that of relay coil 16ª, and relay armature 24 is attracted to close a secondary circuit which includes contact member 25. It will be apparent that a counter-clockwise movement of container 1 will produce the opposite effect, causing the relay to close the secondary circuit which includes contact member 26. I thus utilize the differential between the resistances of the two electrolytic circuits for actuating apparatus which reproduces movements relative to a sensitive element (such as the directional element of a gyro-compass), wherein the force exerted is insufficient to close electric circuits by metallic contact without interfering with the freedom of movement of such sensitive element.

Referring to Fig. 3, 27 represents a gyroscope wheel spinning on a horizontal axis 28, within the casing 29, pivoted on horizontal axis 30 through its center of gravity, and carried by ring 31, which ring is suspended by strand 32 and guided by bearings 33 and 34 to permit of oscillation to a limited extent about its vertical axis, within the frame or phantom 35. Phantom 35 has a hollow stem 36, the upper end of which supports strand 32, permitting of rotation of supporting frame 37 with reference to the directional element. The supporting base frame is mounted in gimbal ring 38 on binnacle stand 39, in a well known manner. Attached to stem 36 is spur gear 40. Mounted on frame 37 is motor 41, attached to the armature shaft of which motor is pinion 42, meshing with spur gear 40. Mounted above spur gear 40 is compass card 43. Ring 44, mounted on frame 37, carries a lubber's line. Also mounted on frame 37 is electrical transmitter 45 which is actuated, through suitable gearing (not shown) by spur gear 40, to transmit (in a manner to be hereinafter described), to a repeater compass or other reproducing apparatus, all movements of phantom 35 relative to the directional element of the gyrocompass. I mount my electrolytic relay container 1 on a platform attached to or integral with frame 35. I attach to ring 31 of the directional element an arm 46, passing through an opening in phantom 35 and carrying at its outer end permanent horseshoe magnet 47. This arm and magnet, like other elements of the gyro-compass, may be counterbalanced.

Referring to Fig. 4, permanent magnet 47 is so mounted that its ends are close to the periphery of container 1 and opposite one of magnetically-responsive elements 7—7ª when said elements are in their normal operative position, i. e. when substantially the same amount of current is flowing through the two electrolytic circuits.

Assuming now that the ship carrying the apparatus veers to the right: the directional element of the gyro-compass, carrying permanent magnet 47, will remain stationary in space, and, due to the attraction of said permanent magnet for magnetically-responsive element 7, housing 5, together with pivotal conductors 6 and 6ª and the magnetically-responsive elements 7 and 7ª will remain stationary with reference to said magnet. However, the clockwise movement with the ship of phantom 35 produces such a displacement between container 1 and housing 5 that the electrolytic paths between stationary conductors 9 and 10 and pivotal conductor 6ª are lengthened, and the resistance of the circuit which includes said conductors and relay coil 16ª is increased, while the length of the electrolytic paths between stationary conductors 8 and 11 and pivotal conductor 6 remains substantially unchanged, and, therefore, the resistance of the circuit which includes said conductors and relay coil 16, remain substantially constant. Relay coil 16 is therefore more strongly energized than is relay coil 16ª, attracting armature 24 and closing the following circuit: from one terminal of source 12 of alternating current, line 48, switch 49, lines 50 and 51, armature 24, contact member 25, lines 52, 53, 54 and 55, field coil 56 of differentially-wound motor 41, line 58, armature of said motor, lines 59, 60, 61 and 62 to opposite terminal of said source 12. Thereupon motor 41 rotates in a direction to return phantom 35, together with container 1, to their original position wherein the resistances of the two electrolytic circuits and the energization of relay coils 16 and 16ª again become substantially equal, whereupon the circuit controlled by relay armature 24 is opened and motor 41 stops. It is apparent that a veering of the ship to the left will produce an opposite effect, resulting in the closing of the circuit, which includes contact member 26 and winding 57 of differentially-wound motor 41, causing said motor to rotate in a direction opposite that just referred to, and to similarly return phantom 35 and container 1 to their original position, opening the circuit which includes motor 41 and stopping said motor. While motor 41 was rotating phantom 35, transmitter 45 was also rotated through spur gear 40, whereby current from source 63 flowed to some of the coils of step-by-step motor 64, which motor drives, through suitable gearing, repeater-compass 65, causing said repeater-compass to reproduce the movements of phantom 35 relative to the directional element of the gyro-compass.

My electrolytic relay system is very sensitive, responding to movements of the phantom relative to the directional element as slight as one-sixth of one degree. Preferably, the relation of the various parts of the device is such that with each deviation of the ship by one-sixth of one degree there is a recurrence of the cycle of operations which I have just described. Thus, should the ship veer 1°, the repeater-compass will be actuated, in increments of one-sixth of one degree, to indicate such a 1° deviation. The device faithfully reproduces movements relative to the directional element of a gyro-compass, and it will be obvious that it may be employed to actuate not only repeater-compasses by which the ship may be manually steered, but also automatic steering apparatus, chart-recording devices, etc.

Movements relative to the directional element of a gyro-compass have heretofore been utilized to actuate external devices. For example, such movements have been employed to directly close metallic electrical contacts. Another method has been to use a roller contact between the directional element and electrical conductors, said conductors being rapidly oscillated in order to overcome static friction. The directional force exerted by the gyroscope is so small that the closing of metallic contacts results in more or less interference with the freedom of movement of the directional element. Where an oscillatory movement is employed to reduce friction, such movement is transmitted throughout the repeater system—causing even the repeater-compass to oscillate. Obviously, this imposes a severe strain upon the entire mechanical structure of the repeater system, and interferes with accurate reading of the repeater-compass. Furthermore, unless such contacts are frequently cleaned and kept smooth, they will quickly deteriorate because of arcing. My invention obviates these and other objectionable features inherent in the devices at present employed to reproduce movements relative to the directional element of a gyro-compass.

While it has been attempted, in the magnetic compass art, to utilize an electrolyte as a portion of electric circuits controlled by movements relative to the magnetic needle, no one, so far as I am aware, has shown means for employing electrolytic circuits in connection with the gyro-compass.

What I claim as new and desire to secure by Letters Patent of the United States is:

1. A gyro-compass system comprising a directional compass element, a rotatable compass element, an electrolytic cell carried by one of said elements, metallic conductors in contact with the electrolyte of said cell and movable with reference to said container, co-acting metallic conductors in contact with said electrolyte and stationary with reference to said container, a magnetically-responsive element co-operative with said movable conductors to control their position, electric circuits including said conductors and electrolyte, a magnet carried by the other of said compass elements to move the movable conductors, and repeating means responsive to changes in resistance of current paths through the electrolyte for reproducing in external apparatus displacement movements between said compass elements.

2. In a navigating system, the combination of a gyro-compass including a directional element, a mounting element therefor, a cell including an electrolyte and conductor means therein movable with respect thereto and carrying a magnetic element, mounted on one of said compass elements, a magnet mounted on the other of said elements and co-operating with the magnetic element in the cell to move the conductor means, a circuit including conductor means fixed with respect to the cell and the movable conductor means and in contact with the electrolyte, and electro-responsive means operative on variation in resistance produced by relative movement between the conductor means.

3. In a gyro-compass, the combination of a directional element, a mounting element therefor, and means for initiating the reproduction in external apparatus of displacement movements between said directional and mounting elements, said means including an electrolytic rheostat carried by one of said compass elements and provided with stationary and movable conductors in contact with the electrolyte, and also provided with an armature fixed with reference to one of said conductors, and magnetic means carried by the other compass element and coacting with the armature for effecting relative movement between said conductors to change the resistance of said rheostat in response to such displacement movements.

4. In a gyro-compass, the combination of a directional element, a mounting element therefor, and means for initiating the reproduction in external apparatus of displacement movements between said directional and mounting elements, said means including an electrolytic rheostat carried by one of said compass elements and provided with stationary and movable conductors in contact with the electrolyte, and also provided with an armature fixed with reference to one of said conductors and substantially vertically disposed in relation to the major axis of the conductor, and magnetic means carried by the other compass element and co-acting with the armature for effecting relative movement between said conductors to change the resistance of said rheostat in response to such displacement movements.

5. In a gyro-compass, the combination of a directional member and means for initiating in apparatus external to said gyro-compass the reproduction of displacement movements relative to said directional member, said means comprising as one element thereof a rheostat provided with an electrolyte, with a stationary and a movable metallic conductor contacting with said electrolyte, with an electric circuit including said electrolyte and conductors, and with an armature fixed with reference to one of said conductors, and comprising as the other element thereof a magnet co-operative with the armature to produce relative movement between the metallic conductors to vary the resistance through an electrolytic path between said conductors, one of the said elements being mounted on said directional member and the other of said elements being mounted movable with reference to said directional member.

6. A gyro-compass comprising a directional element, a mounting element therefor, an electrolytic rheostat carried by one of said elements and comprising a container, a conductor within said container and movable with reference thereto, another conductor within said container and stationary with reference thereto, a body of electrolyte within said container and contacting with said conductors, and an armature fixedly mounted with reference to said movable conductor, and a magnet carried by the other of said compass elements and acting upon said armature to produce relative movement between said conductors upon the occurrence of displacement movements between said compass elements.

EDWARD L. HOLMES.